US010872617B2

(12) United States Patent
Shin

(10) Patent No.: US 10,872,617 B2
(45) Date of Patent: Dec. 22, 2020

(54) USER COMMAND PROCESSING METHOD AND SYSTEM FOR ADJUSTING OUTPUT VOLUME OF SOUND TO BE OUTPUT, ON BASIS OF INPUT VOLUME OF RECEIVED VOICE INPUT

(71) Applicants: NAVER Corporation, Seongnam-si (KR); LINE Corporation, Tokyo (JP)

(72) Inventor: Myeongsoo Shin, Seongnam-si (KR)

(73) Assignees: NAVER Corporation, Seongnam-si (KR); LINE Corporation, Tokyo (JP)

( * ) Notice: Subject to any disclaimer, the term of this patent is extended or adjusted under 35 U.S.C. 154(b) by 0 days.

(21) Appl. No.: 16/678,419

(22) Filed: Nov. 8, 2019

(65) Prior Publication Data
US 2020/0075036 A1    Mar. 5, 2020

Related U.S. Application Data

(63) Continuation of application No. PCT/KR2018/004498, filed on Apr. 18, 2018.

(30) Foreign Application Priority Data

May 12, 2017  (KR) .......................... 10-2017-0059316

(51) Int. Cl.
*G06F 3/16*    (2006.01)
*G10L 25/21*   (2013.01)
(Continued)

(52) U.S. Cl.
CPC .............. *G10L 25/21* (2013.01); *G06F 3/167* (2013.01); *G10L 15/22* (2013.01); *G10L 17/26* (2013.01);
(Continued)

(58) Field of Classification Search
CPC ......... G10L 25/78; G10L 15/22; G10L 17/26; G10L 2015/223; G10L 2025/783; G10L 25/21; G06F 3/167
See application file for complete search history.

(56) References Cited

U.S. PATENT DOCUMENTS 9,830,924 B1 *  11/2017  Degges, Jr. ............. G10L 21/00
2013/0177139 A1 *  7/2013  Forsee, II ........... H04M 3/5166
                                                    379/88.01
(Continued)

FOREIGN PATENT DOCUMENTS

JP    H10-326175 A    12/1998
JP    2002-350167 A   12/2002
(Continued)

OTHER PUBLICATIONS

International Search Report for International Application No. PCT/KR2018/004498 dated Jul. 23, 2018.

*Primary Examiner* — Regina N Holder
(74) *Attorney, Agent, or Firm* — Harness, Dickey & Pierce, P.L.C.

(57) ABSTRACT

Provided is a user command processing method and system for adjusting an output volume of a sound to be output on the basis of an input volume of a received voice input. A user command processing method may comprise the steps of: receiving a voice input from a user; measuring an input volume of the received voice input; and adjusting an output volume of a sound to be output in response to the received voice input, according to the measured input volume.

16 Claims, 12 Drawing Sheets

(51) Int. Cl.
*G10L 15/22* (2006.01)
*G10L 25/78* (2013.01)
*G10L 17/26* (2013.01)

(52) U.S. Cl.
CPC ........ *G10L 25/78* (2013.01); *G10L 2015/223* (2013.01); *G10L 2025/783* (2013.01)

(56) References Cited

U.S. PATENT DOCUMENTS

2014/0135076 A1* 5/2014 Lee ................... H04M 1/6041
                                                              455/569.1
2015/0120304 A1* 4/2015 Yamashita ............. G10L 15/22
                                                              704/270.1
2018/0174589 A1* 6/2018 Choi ........................ G10L 15/02

FOREIGN PATENT DOCUMENTS

| | | |
|---|---|---|
| JP | 2009-141843 A | 6/2009 |
| JP | 2014-017735 A | 1/2014 |
| JP | 201402808 | * 10/2014 |
| KR | 10-1998-0041437 A | 8/1998 |
| KR | 10-2004-0096330 A | 11/2004 |
| KR | 10-1387928 B1 | 4/2014 |

* cited by examiner

USER COMMAND PROCESSING METHOD AND SYSTEM FOR ADJUSTING OUTPUT VOLUME OF SOUND TO BE OUTPUT, ON BASIS OF INPUT VOLUME OF RECEIVED VOICE INPUT

CROSS-REFERENCE TO RELATED APPLICATIONS

This U.S. non-provisional application is a continuation application of, and claims the benefit of priority under 35 U.S.C. § 365(c) from International Application PCT/KR2018/004498, which has an International filing date of Apr. 18, 2018 which claims priority to Korean Patent Application No. 10-2017-0059316, filed May 12, 2017, the entire contents of which are incorporated herein by reference in their entirety.

TECHNICAL FIELD

One or more example embodiments related to a method, system, apparatus, and/or non-transitory computer readable medium for adjusting an output volume of a sound based on an input volume of a received voice input.

RELATED ART

A device operating based on audio cues, such as an artificial intelligence (AI) speaker of a home network service, may receive a voice input of a user and may synthesize and thereby provide an answer based on the voice input or may output audio content in response to the voice input.

However, when the volume is preset at a significantly high level, a user or a person around the user may be surprised at the sound, or when the volume is preset at a significantly low level, the user may not properly hear the audio or the answer. After the user hears the sound that is outputted at the preset volume, the user may have to manually adjust the volume based on the volume of the output sound.

SUMMARY

The example embodiments provide a user command processing method and system that may adjust an output volume of sound to be output based on an input volume of a voice input received from a user such that the user may adjust the output volume of sound to be output simultaneously with the voice input of the user, a computer program stored in a non-transitory computer-readable storage medium to implement the user command processing method on a computer in conjunction with the computer, a processor to execute the computer program, and the non-transitory computer-readable storage medium.

The example embodiments also provide a user command processing method and system that may output visual information corresponding to sound through a display of another device based on an input volume of a voice input received from a user and/or an output accuracy for the sound to be output, a computer program stored in a non-transitory computer-readable storage medium to implement the user command processing method on a computer in conjunction with the computer, and the non-transitory computer-readable storage medium.

The embodiments also provide a user command processing method and system that may adjust an output volume of sound based on an utterance duration of a keyword for adjusting the output volume of sound to be output, a computer program stored in a non-transitory computer-readable storage medium to implement the user command processing method on a computer in conjunction with the computer, and the non-transitory computer-readable storage medium.

The example embodiments also provide a user command processing method and system that responds to a received voice input with a sound to be output. The sound to be output may comprise at least an answer and/or audio content in response to the voice input.

The example embodiments also provide a user command processing method and system that may adjust an output volume of sound to be output based on an input volume for a keyword preset to wake up an electronic device, a computer program stored in a non-transitory computer-readable storage medium to implement the user command processing method on a computer in conjunction with the computer, and the non-transitory computer-readable storage medium.

The example embodiments also provide a user command processing method and system that may adjust an output volume of the sound to be output by measuring a noise volume for ambient noise, and further using the noise volume for the ambient noise to adjust the output volume of the sound, a computer program stored in a non-transitory computer-readable storage medium to implement the user command processing method on a computer in conjunction with the computer, and the non-transitory computer-readable storage medium.

The example embodiments also provide a user command processing method and system that may activate a function for adjusting an output volume at a current time based on a set time information for a preset time, the set time information having preset volume control parameters, a computer program stored in a non-transitory computer-readable storage medium to implement the user command processing method on a computer in conjunction with the computer, and the non-transitory computer-readable storage medium.

DETAILED DESCRIPTION

Figure 1:
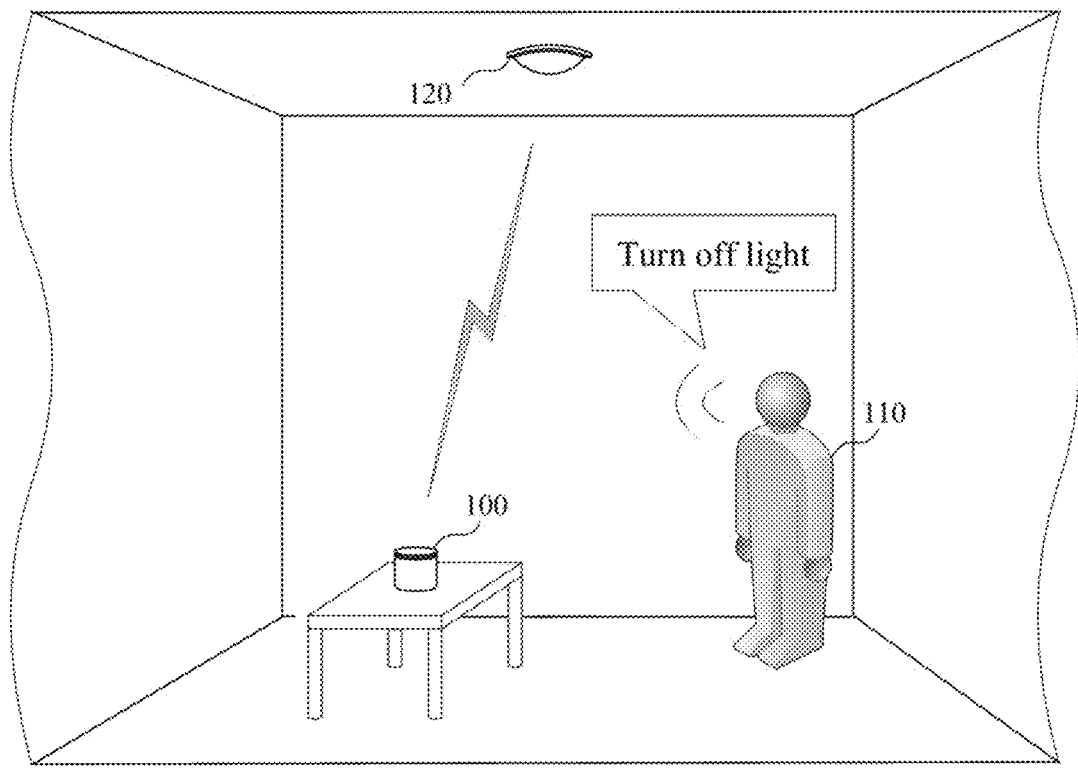
FIG. 1 illustrates an example of a service environment using a voice-based interface according to an example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A user command processing system according to some example embodiments may be configured through an electronic device providing an interface that operates based on a voice. A user command may include a voice input received from a user, and the electronic device may process the user command by recognizing and analyzing the voice input directly or through an external platform that is connected through a separate interface connect. Here, the electronic device may adjust an output volume of sound to be output, for example, audio of content to be provided in response to a voice input (hereinafter "audio content") and/or an output voice based on a volume of the input voice. A user command processing method according to the example embodiments may be performed through the aforementioned electronic device. Here, a computer program according to an example embodiment may be installed and executed on the electronic device, and the electronic device may perform the user command processing method under the control of the executed computer program. The aforementioned computer program may be stored in a non-transitory computer-readable storage medium to implement the user command processing method on a computer in conjunction with the electronic device configured as the computer.

FIG. 1 illustrates an example of a service environment using a voice-based interface according to an example embodiment. The example embodiment of FIG. 1 represents an electronic device 100 having an interface that operates based on a voice recognizes and analyzes the voice input "Turn off light" received in response to an utterance of a user 110 and controls the status of an in-house lighting device 120 connected to the electronic device 100 through an internal network for connecting and controlling in-house devices.

For example, in-house devices may include various devices connectable and controllable online, for example, a personal computer (PC); a peripheral device; home appliances such as a television (TV), a refrigerator, and a robot cleaner; energy consumption devices such as a water supply; an environmental control device; and security devices such as a surveillance camera and a door lock, in addition to the aforementioned in-house lighting device 120. Also, the internal network may employ wired network technology, for example, Ethernet, HomePNA, and Institute of Electrical and Electronics Engineers (IEEE) 1394, and wireless network technology such as Bluetooth, ultra wideband (UWB), ZigBee, wireless 1394, and a home radio frequency (RF).

The electronic device 100 may be an in-house device. For example, the electronic device 100 may be a device such as an AI speaker or a robot cleaner provided in a house. The electronic device 100 may be a mobile device of the user 110, for example, a smartphone, a mobile phone, a laptop computer, a digital broadcasting terminal, a personal digital assistant (PDA), a portable multimedia player (PMP), and a tablet PC. As described above, any type of devices including a function connectable to an in-house device, to receive a voice input of the user 110, and to control the in-house devices may also be used for the electronic device 100 without being particularly limited.

Figure 2:
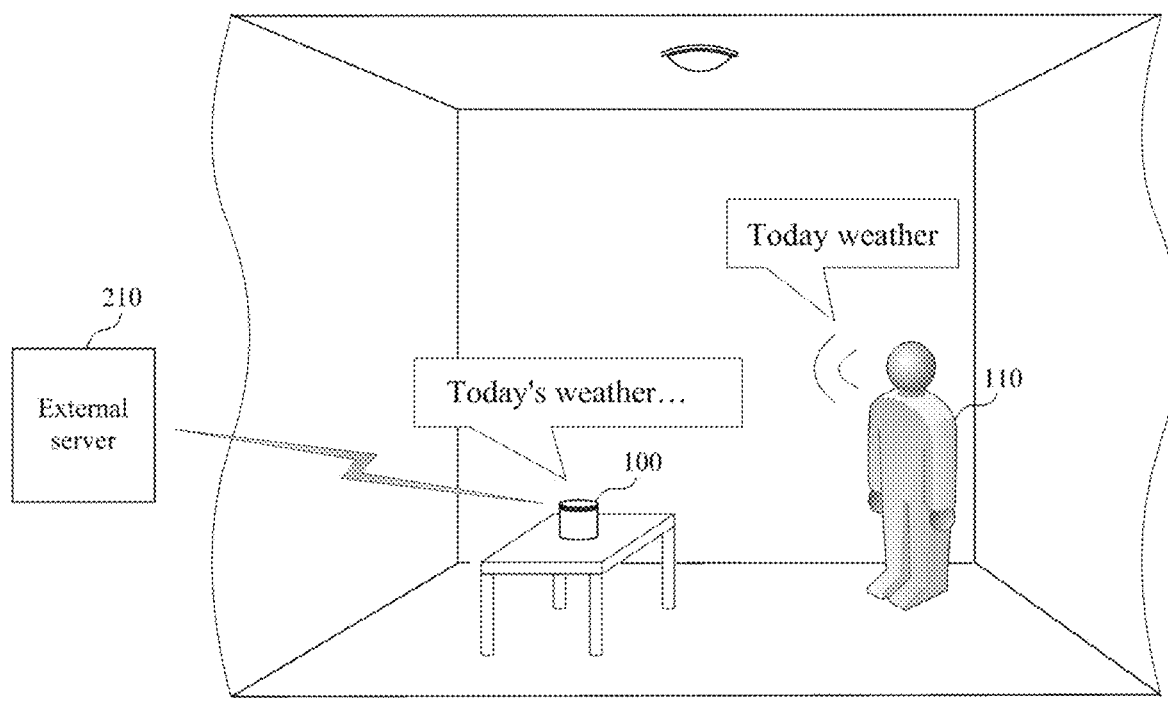
FIG. 2 illustrates another example of a service environment using a voice-based interface according to an example embodiment.

FIG. 2 illustrates another example of a service environment using a voice-based interface according to an example embodiment. The example embodiment of FIG. 2 represents an example in which the electronic device 100 has an interface that operates based on a voice recognizes and analyzes the voice input "Today weather" received in response to an utterance of the user 110, acquires information about today's weather from an external server 210 over an external network, and outputs the acquired information using voice.

For example, the external network may include at least one of the network topologies that include a personal area network (PAN), a local area network (LAN), a campus area network (CAN), a metropolitan area network (MAN), a wide area network (WAN), a broadband network (BBN), and the Internet.

In the example embodiment of FIG. 2, the electronic device 100 may be an in-house device, a mobile devices of the user 110, or a combination of networked thereof. Any type of device including a function for receiving and processing a voice input of the user 110 and a function for connecting to the external server 210 and providing content or a service provided from the external server 210 to the user 110 may be used for the electronic device 100 without being particularly limited.

As described above, without any particular limitation, the electronic device 100 according to example embodiments may use any device capable of processing a user command through a voice-based interface. For example, the electronic device 100 may directly process the user command by recognizing and analyzing the voice input of the user 110 and by performing an operation suitable for the voice input. Depending on example embodiments, processing such as recognition of the voice input of the user 110, analysis of the recognized voice input, and synthesis of voice to be provided to the user 110 may be performed through an external platform linked to the electronic device 100.

Figure 3:
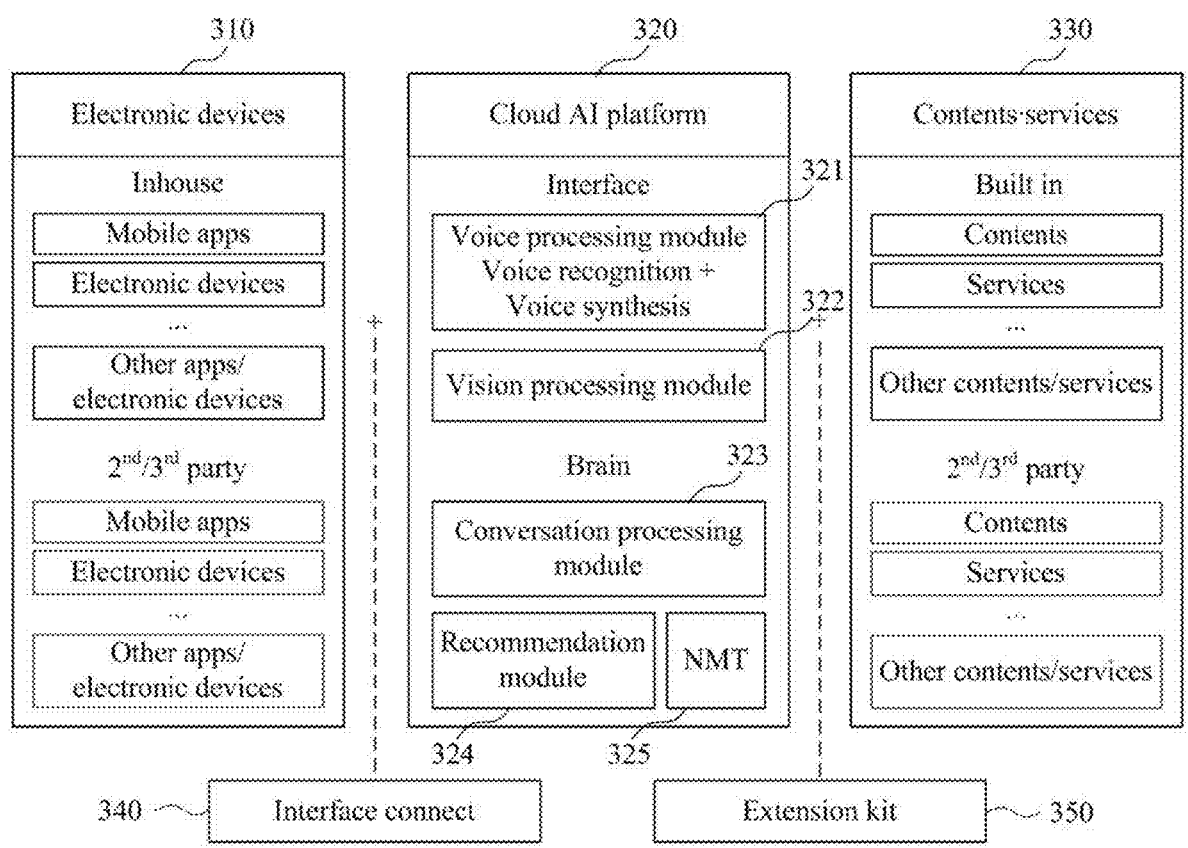
FIG. 3 illustrates an example of a cloud artificial intelligence (AI) platform according to an example embodiment.

FIG. 3 illustrates an example of a cloud artificial intelligence (AI) platform according to an example embodiment. FIG. 3 illustrates electronic devices 310, a cloud AI platform 320, and a content/service 330.

For example, the electronic devices 310 may indicate devices provided in a house, and may at least include the aforementioned electronic device 100. The electronic devices 310 or applications (hereinafter, apps) installed and executed on the electronic devices 310 may be linked to the cloud AI platform 320 through an interface connect 340. Here, the interface connect 340 may provide developers with a software development kit (SDK) and/or development documents for developing the electronic devices 310 or apps installed and executed on the electronic devices 310. Also, the interface connect 340 may provide an application program interface (API) such that the electronic devices 310 or the apps installed and executed on the electronic devices 310 may use functions provided from the cloud AI platform 320. In detail, devices or apps developed by the developers using the SDK and/or development documents provided from the interface connect 340 may use functions provided from the cloud AI platform 320 using the API provided from the interface connect 340.

Here, the cloud AI platform 320 may provide a function for providing a voice-based service. For example, the cloud AI platform 320 may include various modules for providing a voice-based service, such as a voice processing module 321 configured to recognize a received voice and synthesize a voice to be output, a vision processing module 322 configured to analyze and process a received image or video, a chat processing module 323 configured to determine an appropriate chat to output a voice suitable for the received voice, a recommendation module 324 configured to recommend a function suitable for the received voice, and a neural machine translation (NMT) 325 configured to support AI to translate a language based on a sentence unit through data learning.

For example, in the example embodiments of FIGS. 1 and 2, the electronic device 100 may transmit a voice input of the user 110 to the cloud AI platform 320 using the API provided from the interface connect 340. In this case, the cloud AI platform 320 may recognize and analyze the received voice input through the aforementioned modules 321 through 325, and may synthesize and provide an appropriate answer or may recommend an appropriate operation in response to the received voice input.

Also, an expansion kit 350 may provide a development kit such that third party content developers or companies may configure a new voice-based function based on the cloud AI platform 320. For example, in the example embodiment of FIG. 2, the electronic device 100 may transmit the received voice input of the user 110 to the external server 210, and the external server 210 may transmit the voice input to the cloud AI platform 320 through the API provided through the expansion kit 350. In this case, similar to the aforementioned manner, the cloud AI platform 320 may recognize and analyze the received voice input and may synthesize and provide an appropriate answer or may provide the external server 210 with recommendation information about a function to be processed through the voice input. The external server 210 may transmit the voice input "Today weather" to the cloud AI platform 320 and may receive, from the cloud AI platform 320, keywords "today" and "weather" that are extracted by recognizing the voice input "Today weather". In this case, the external server 210 may generate text information, such as "Today's weather . . . " using the keywords "today" and "weather" and may transmit again the generated text information to the cloud AI platform 320. Here, the cloud AI platform 320 may synthesize the text information into an audible answer and may provide the synthesized answer to the external server 210. The external server 210 may transmit the synthesized audible answer to the electronic device 100 and the electronic device 100 may output the synthesized audible answer ("Today's weather . . . ") through a speaker. In this manner, the voice input "today weather" received from the user 110 may be processed.

Figure 4:
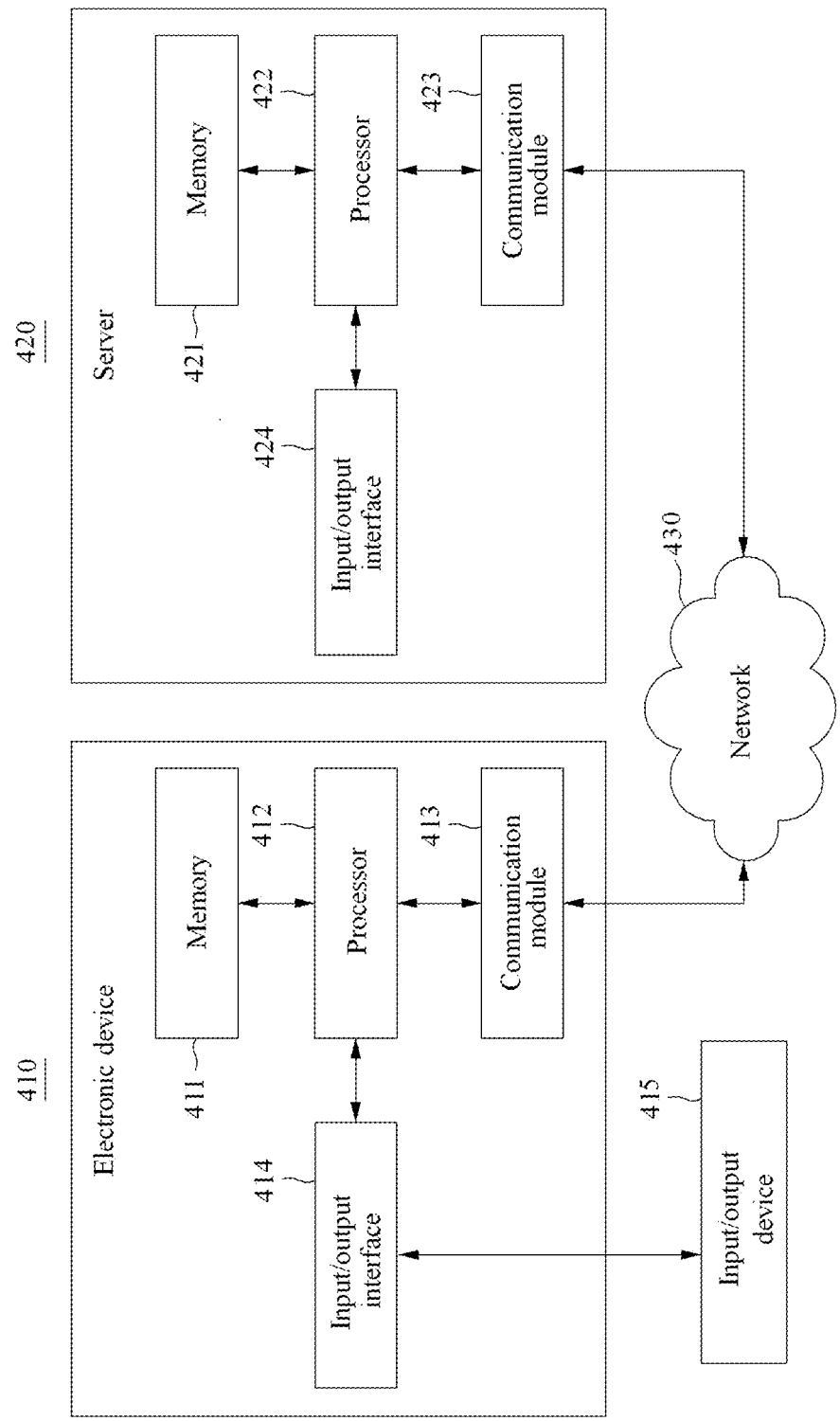
FIG. 4 is a block diagram illustrating a configuration of an electronic device and a server according to an example embodiment.

FIG. 4 is a block diagram illustrating an example of an electronic device and a server according to an example embodiment. An electronic device 410 of FIG. 4 may correspond to the aforementioned electronic device 100, and a server 420 may correspond to the aforementioned external server 210 or a single computer apparatus that configures the cloud AI platform 320.

Referring to FIG. 4, the electronic device 410 may include a memory 411, a processor 412, a communication module 413, and an input/output (I/O) interface 414, and the server 420 may include a memory 421, a processor 422, a communication module 423, and an I/O interface 424. The memory 411, 421 may include a permanent mass storage device, such as random access memory (RAM), a read only memory (ROM), and a disk drive, as a non-transitory computer-readable storage medium. The permanent mass storage device, such as ROM and disk drive, may be included in the electronic device 410 or the server 420 as a permanent storage device separate from the memory 411, 421. Also, an OS or at least one program code, for example, a code for an application installed and executed on the electronic device 410 to provide a specific service, may be stored in the memory 411, 421. Such software components may be loaded from another non-transitory computer-readable storage medium separate from the memory 411, 421. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 411, 421 through the communication module 413, 423, instead of the non-transitory computer-readable storage medium. For example, at least one program may be loaded to the memory 411 of the electronic device 410 based on a computer program, for example, the application, installed by files provided over the network 430 from developers or a file distribution system providing an installation file of the application.

The processor 412, 422 may be configured to process instructions of a computer program by performing basic arithmetic operations, logic operations, and I/O operations. The processor 412, 422 may include processing circuitry such hardware including logic circuits; a hardware/software combination such as a processor executing software; or a combination thereof. For example, the processing circuity more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. The computer-readable instructions may be provided from the memory 411, 421 or the communication module 413, 423 to the processor 412, 422. For example, the processor 412, 422 may be configured to execute received instructions in response to the program code stored in the storage device, such as the memory 411, 421.

The communication module 413, 423 may provide a function for communication between the electronic device 410 and the server 420 over the network 430 and may provide a function for communication between the electronic device 410 and/or the server 420 with another electronic device or another server. For example, the processor 412 of the electronic device 410 may transfer a request created based on a program code stored in the storage device such as the memory 411, to the server 420 over the network 430 under control of the communication module 413. Inversely, a control signal, an instruction, content, a file, etc., provided under control of the processor 422 of the server 420 may be received at the electronic device 410 through the communication module 413 of the electronic device 410 by going through the communication module 423 and the network 430. For example, a control signal, an instruction, content, a file, etc., of the server 420 received through the communication module 413 may be transferred to the processor 412 or the memory 411, and content, a file, etc., may be stored in a storage medium, for example, the permanent storage device, further includable in the electronic device 410. The communication module 413, 423 may have communication integrated circuitry to facilitate and control communication with the network 430; a hardware/software combination such as a processor executing software; an antenna communicating with the network 430 through an asymmetrical access point or through a symmetrical connection; a wired-connection to the network 430 and/or to the electronic device 410; or a combination thereof.

The I/O interface 414 may be a device used for interfacing with an I/O apparatus 415. For example, an input device may include an input, such as a microphone, a keyboard, and a mouse, and an output device may include a device, such as a display and a speaker. As another example, the I/O interface 414 may be a device for interface with an apparatus in which an input function and an output function are integrated into a single function, such as a touchscreen. The I/O apparatus 415 may be configured as a single device with the electronic device 410. Also, the I/O interface 424 of the server 420 may be a device for interface with an apparatus (not shown) for input or output that may be connected to the server 420 or included in the server 420.

According to other example embodiments, the electronic device 410 and the server 420 may include a smaller or greater number of components than the number of components shown in FIG. 4. For example, the electronic device 410 may include at least a portion of the I/O apparatus 415, or may further include other components, for example, a transceiver, a global positioning system (GPS) module, a camera, a variety of sensors, a database (DB), and the like. If the electronic device 410 is a smartphone, the electronic device 410 may be configured to further include a variety of components, for example, an accelerometer sensor, a gyro sensor, a camera module, various physical buttons, a button using a touch panel, an I/O port, a vibrator for vibration, etc., which are generally included in the smartphone.

In the example embodiments, the electronic device 410 may basically include a microphone for receiving a voice input of the user as the I/O apparatus 415, and may further include a speaker for outputting sound such as an answer or audio content corresponding to the voice input of the user as the I/O apparatus 415.

Here, the electronic device 410 may adjust an output volume of sound to be output in response to the voice input of the user based on an input volume of the voice input of the user. Here, the output volume may be proportional to the input volume. For example, the volume of an output in response to the user's command may be adjusted to increase relative to the loudness of the user calling the electronic device 410. Inversely, the quieter the user's call to the electronic device 410, the lower the volume of the sound output in response. In another embodiment, the output volume of the sound to be outputted may be adjusted to be identical to the input volume of the user's voice. If the user calls the electronic device 410 in a low or whispering voice, the electronic device 410 may also respond to the call in a small or whispering voice.

Figure 5:
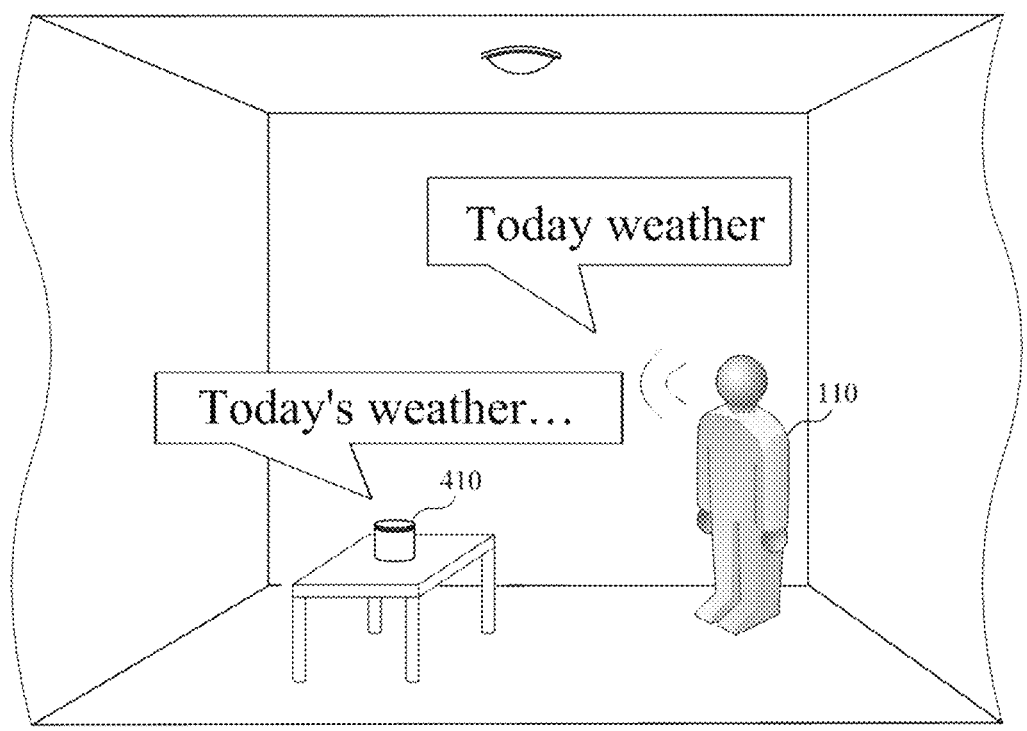
FIGS. 5 and 6 illustrate examples of adjusting an output volume based on an input volume according to an example embodiment.
Figure 6:
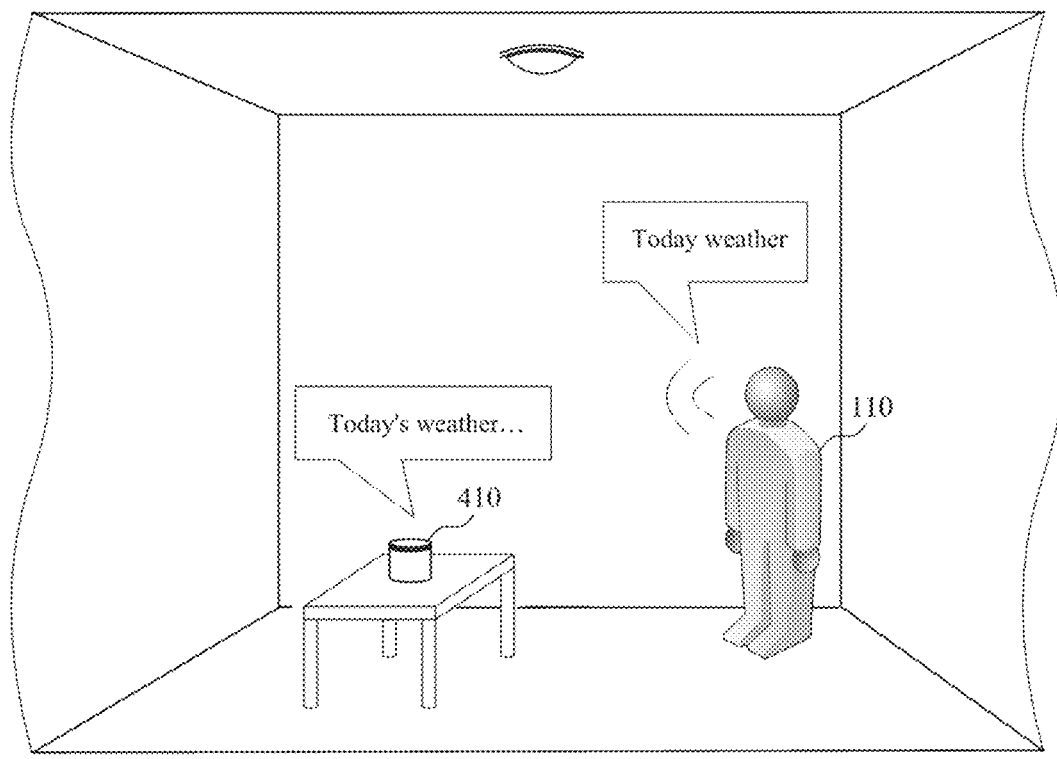

FIGS. 5 and 6 illustrate examples of adjusting an output volume based on an input volume according to an example embodiment. FIGS. 5 and 6 represent an example of automatically adjusting an output volume of sound to be output from the electronic device 410 based on an input volume of a voice input of the user 110 as an example of expressing a volume using a size of a character. FIG. 5 represents an example in which the electronic device 410 outputs sound at a relatively high volume in response to a voice of a relatively high volume (the larger the illustrated characters the higher the volume represented) compared to the example of FIG. 6. FIG. 6 comparatively illustrates an example in which the electronic device 410 outputs sound at a relatively low volume in response to a voice of a relatively low volume (the smaller the illustrated character the lower the volume represented).

Figure 7:
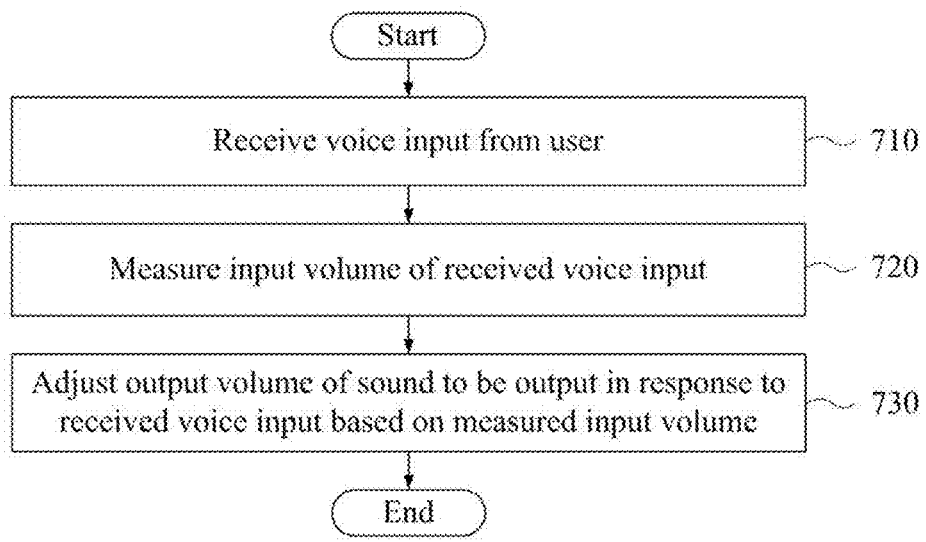
FIG. 7 is a flowchart illustrating an example of a user command processing method performed by an electronic device according to an example embodiment.

FIG. 7 is a flowchart illustrating an example of a user command processing method performed by an electronic device according to an example embodiment. A user command processing system according to example embodiments may be configured in a form of a computer apparatus such as the aforementioned electronic device 410. The electronic device 410 may perform operations 710 to 730 included in the user command processing method of FIG. 7. Here, the processor 412 may be configured to execute a control instruction according to a code of at least one program or a code of an OS included in the memory 411. Here, the processor 412 may control the electronic device 410 to perform operations 710 to 730 of FIG. 7 in response to a control instruction provided from the code stored in the electronic device 410.

In operation 710, the electronic device 410 may receive a voice input from a user. For example, the electronic device 410 may receive a voice input according to an utterance of the user through a voice input device, such as a microphone in the electronic device 410.

In operation 720, the electronic device 410 may measure an input volume of the received voice input. Any method capable of representing a volume of sound as a numerical value may be used to measure the volume. For example, the electronic device 410 may measure the input volume as a value of a VU unit acquired by measuring audio frequency current associated with the sound from the received voice input.

In operation 730, the electronic device 410 may adjust an output volume of sound to be output in response to the received voice input based on the measured input volume. For example, the electronic device 410 may adjust the output volume of the sound to be output to be proportional to the measured input volume. The sound to be output in response to the voice input may include an answer and/or audio content corresponding to the voice input.

Therefore, although the user is unaware of a preset output volume, the user may intuitively adjust the output volume by adjusting a volume of a voice uttered by the user for a user command.

As another example embodiment, the electronic device 410 may measure an input volume for a keyword that is preset to wake up the electronic device 410 among keywords included in the voice input, instead of measuring the input volume for all the voices included in the voice input of the user in operation 720.

Figure 8:
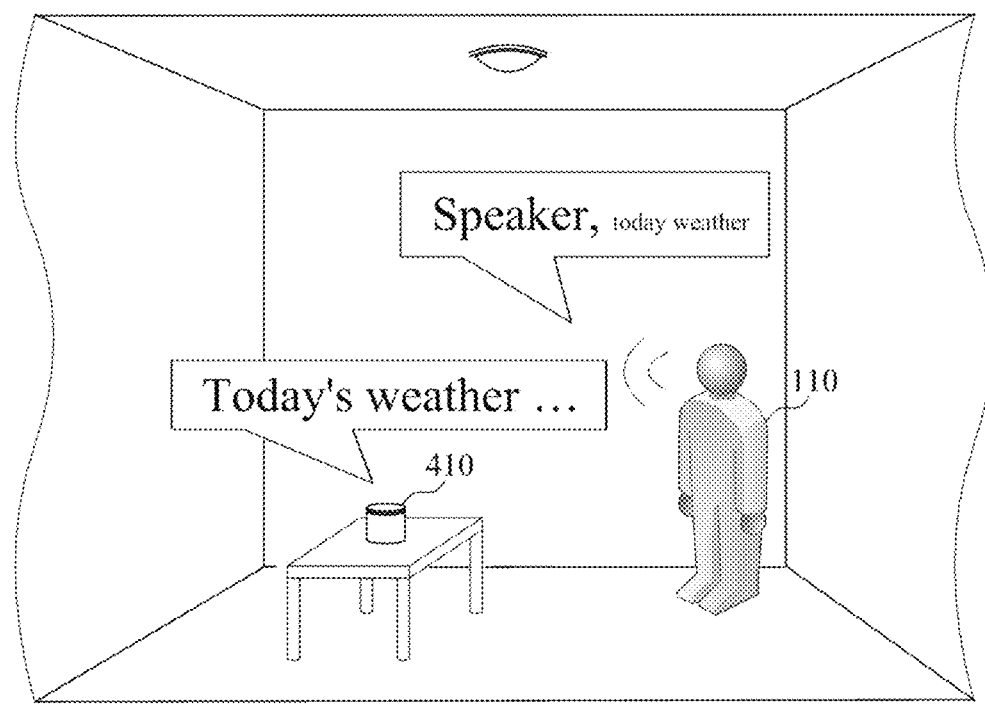
FIGS. 8 and 9 illustrate examples of adjusting an output volume of sound based on an input volume for a preset keyword according to an example embodiment.
Figure 9:
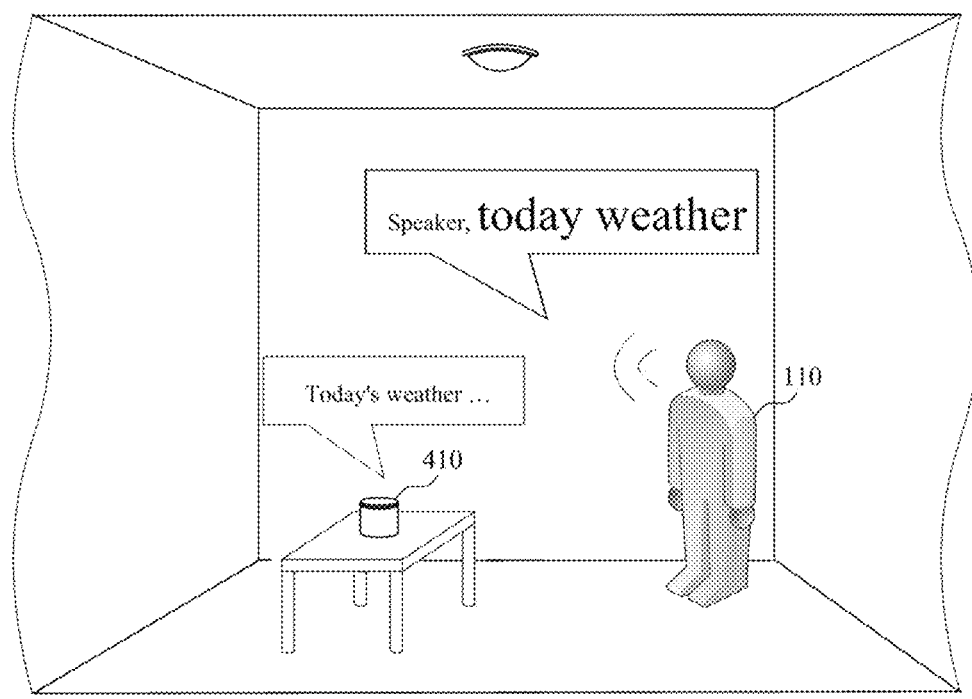

FIGS. 8 and 9 illustrate examples of adjusting an output volume of sound based on an input volume for a preset keyword according to an example embodiment. FIGS. 8 and 9 represent examples of expressing an input volume and an output volume using a size of a character included in a speech balloon. The electronic device 410 may normally operate in a sleep state. A mode of the electronic device 410 may change from the sleep state to a wakeup state in response to receiving, from the user, a keyword preset to wake up the electronic device 410, and may recognize a voice input of the user input with the keyword as a user command. FIGS. 8 and 9 illustrate an example of using "speaker" as a preset keyword and an example of adjusting an output volume of sound to be output based on an input volume measured for the keyword "speaker".

FIG. 8 illustrates an example in which the preset keyword "speaker" has a relatively high volume compared to an actual user command "today weather". Here, an output volume of sound "Today's weather . . . " to be output from the electronic device 410 is adjusted based on an input volume corresponding to "speaker" and is relatively higher than the input volume for the actual user command "today weather".

On the contrary, FIG. 9 illustrates an example in which the preset keyword "speaker" has a relatively low volume compared to an actual user command "today weather". Here, an output volume of sound "Today's weather . . . " to be output from the electronic device 410 is relatively lower than the input volume for the actual user command "today weather".

As described above, according to example embodiments, the user may intuitively adjust the output volume of sound to be output even through an input volume for a portion such as a specific keyword, instead of using the entire voice input of the user.

Figure 10:
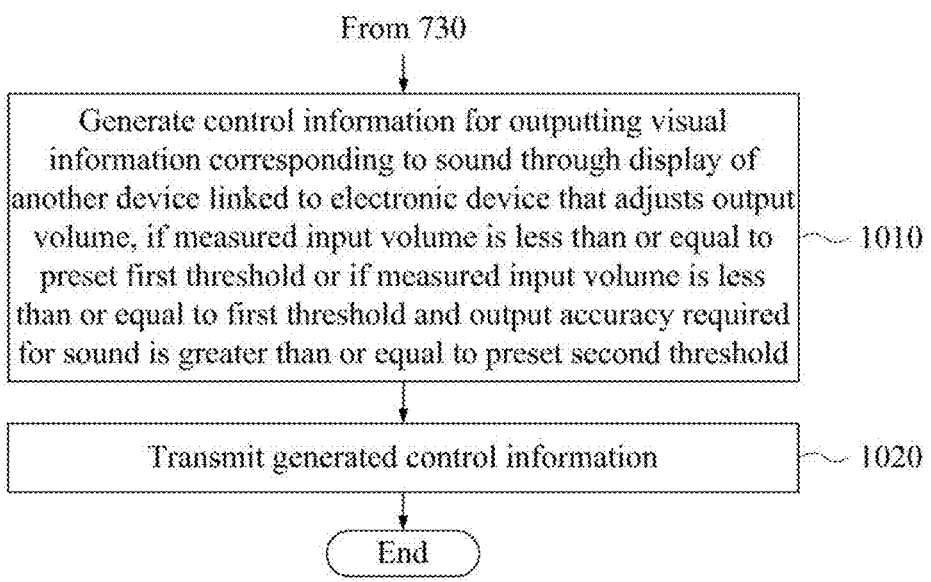
FIG. 10 is a flowchart illustrating an example of a user command processing method of additionally providing visual information corresponding to sound to be output according to an example embodiment.

FIG. 10 is a flowchart illustrating an example of a user command processing method of additionally providing visual information corresponding to sound to be output according to an example embodiment. Operations 1010 and 1020 of FIG. 10 may be performed after operation 730 of FIG. 7.

In operation 1010, if the measured input volume is less than or equal to a preset first threshold or if the measured input volume is less than or equal to the first threshold and an output accuracy for the sound is greater than or equal to a preset accuracy threshold, the electronic device 410 may generate control information for outputting visual information corresponding to the sound through a display of another device linked to the electronic device 410 that adjusts the output volume.

For example, if the measured input volume is significantly low, the user may not properly hear the sound of the output volume that is adjusted based on the measured input volume. Also, in some situations, such as in the case where the sound to be outputted is longer than a preset duration or contains relatively important information, a high output accuracy may be required. Accordingly, if the measured input volume is less than or equal to the preset first threshold or if the measured input volume is less than or equal to the first threshold (a preset duration) and the output accuracy for the sound to be outputted is greater than or equal to a preset accuracy threshold, the electronic device 410 may output visual information corresponding to the sound through another device including a display. To this end, the electronic device 410 may generate control information for outputting visual information corresponding to the sound through not the electronic device 410 but another device connected to the electronic device 410, based on the aforementioned specific condition.

In operation 1020, the electronic device 410 may transmit the generated control information. Here, the generated control information may be directly forwarded from the electronic device 410 to the other device or may be forwarded to the other device through the external server 210 of FIG. 2. For example, the control information may be forwarded to a smartphone of the user and visual information may be displayed on a display included in the smartphone based on the control information. The control information, for example, may be transmitted directly as a signal between two devices or as a signal between two devices through a relay of a server.

As another example embodiment, the electronic device 410 may adjust an output volume of sound to be output based on an utterance duration of a specific keyword. For example, when the voice input includes a keyword for adjusting the output volume of sound, the output volume of sound may increase or decrease to be proportional to the utterance duration of the keyword.

Figure 11:
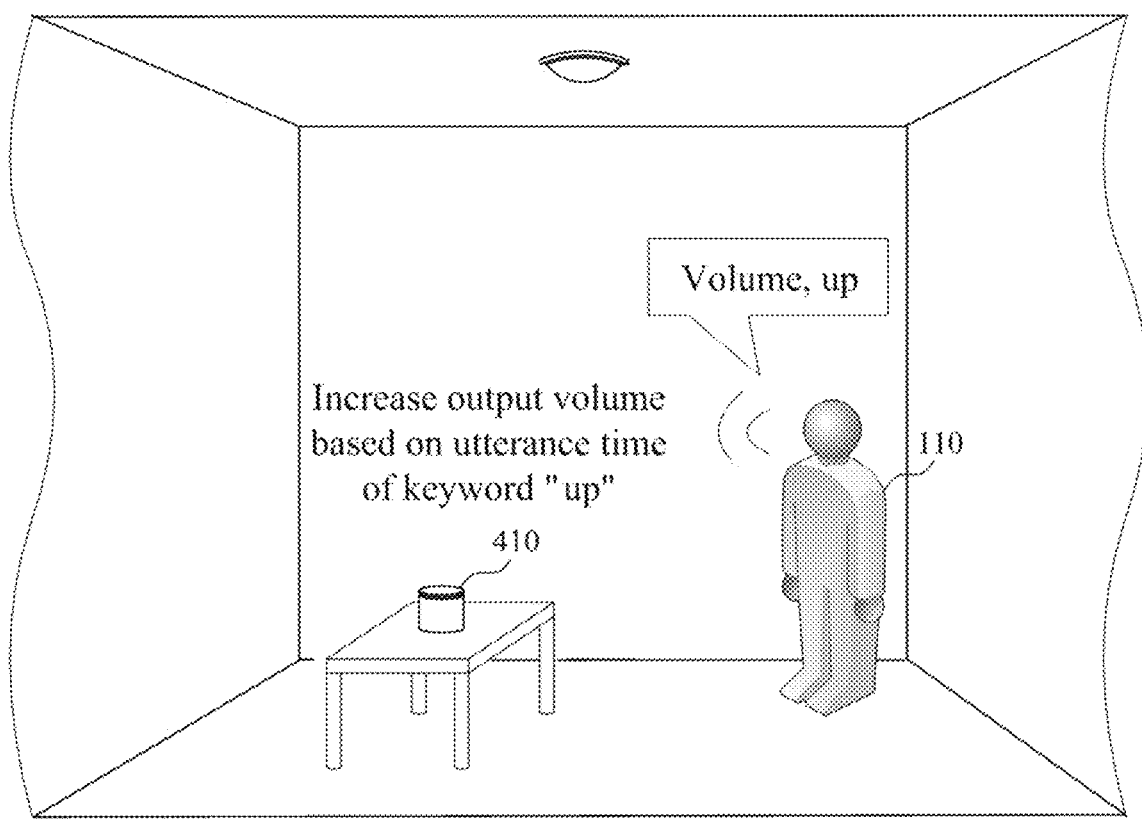
FIG. 11 illustrates an example of adjusting an output volume of sound to be output based on an utterance duration of a keyword according to an example embodiment.

FIG. 11 illustrates an example of adjusting an output volume of sound to be output based on an utterance duration of a keyword according to an example embodiment. Referring to FIG. 11, with respect to a voice input "Volume up", an output volume may increase based on an utterance duration of a keyword "up" for adjusting the output volume of sound. For example, the utterance duration of the specific keyword may be adjusted, such as the user utters a keyword "up" over 1 second and the user utters a keyword "up" over 3 seconds. Here, a variation width of the output volume may increase according to an increase in the utterance duration. That is, when the user utters the keyword "up" over 3 seconds compared to uttering the keyword "up" over 1 second, an increase width of the output volume may further increase. Inversely, a decrease width of the output volume may further increase based on an utterance duration of a keyword of the voice input, such as "reduce sound" or "volume down".

As another example embodiment, the electronic device 410 may adjust an output volume of sound to be output by using a noise volume for ambient noise as an additional parameter.

Figure 12:
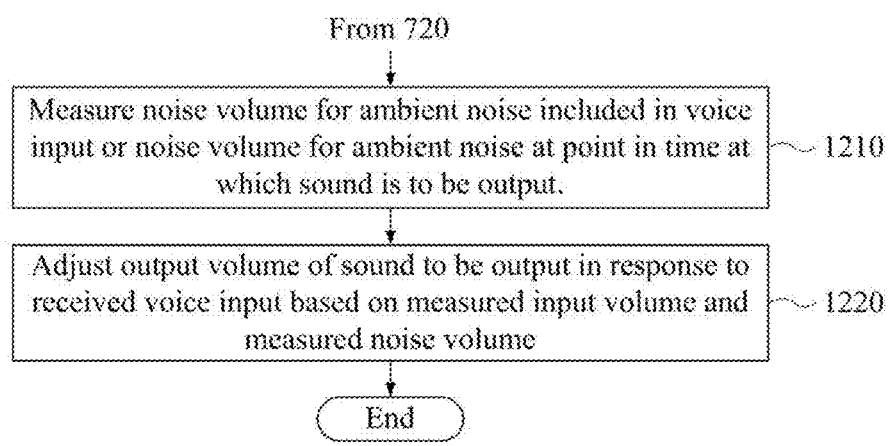
FIG. 12 is a flowchart illustrating an example of a user command processing method of adjusting an output volume of sound to be output based on a noise volume for ambient noise according to an example embodiment.

FIG. 12 is a flowchart illustrating an example of a user command processing method of adjusting an output volume of sound to be output based on a noise volume for ambient noise according to an example embodiment. Operations 1210 and 1220 of FIG. 12 may be performed after operation 720 of FIG. 7 and instead of operation 730.

In operation 1210, the electronic device 410 may measure a noise volume for ambient noise included in the voice input or a noise volume for ambient noise at a point in time at which the sound is to be output.

In operation 1220, the electronic device 410 may adjust the output volume of sound to be output in response to the received voice input based on the measured input volume and the measured noise volume.

For example, the electronic device 410 may adjust the output volume of sound to be output based on the measure input volume and, here, may additionally further adjust the output volume of sound to be output based on a noise volume for ambient noise. In detail, for example, the electronic device 410 may adjust the adjusted output volume to increase according to an increase in the noise volume at a time of the utterance of the user or the noise volume at a point in time at which the sound is output.

As another example embodiment, the electronic device 410 may control a function of adjusting the output volume of sound based on the measured input volume to be activated in a specific timeline. For example, operations of FIG. 7 may be performed only when a current time corresponds to set time information preset to the electronic device 410 or a function for adjusting the output volume may be set to be activated in a timeline such as midnight or dawn in which the output volume of sound is sensitive. The set time information may have preset volume control parameters. The preset volume control parameters may include, but is not limited to, a timeline for when the electronic device 410 may adjust the output, instructions setting an upper or lower cap for the volume of the output sound, instructions for when certain features may be implemented, instructions for when certain devices may be implemented, etc.

As described above, according to some of the example embodiments, it is possible to adjust an output volume of sound to be output based on an input volume of a voice input received from a user such that the user may adjust the output volume of sound to be output simultaneously with a user command. Also, it is possible to output visual information corresponding to sound through a display of another device based on an input volume of a voice input received from a user and/or an output accuracy for the sound to be output and a probability that the user may not properly hear the sound. Also, it is possible to adjust an output volume of sound based on an utterance duration of a keyword for adjusting the output volume of sound to be output and to adjust an output volume of sound to be output based on an input volume for a keyword preset to wake up an electronic device providing a voice-based interface. Also, it is possible to adjust an output volume of sound to be output by further using ambient noise and to activate a function for adjusting an output volume based on an input volume at a preset time.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A user command processing method comprising:
   receiving a voice input from a user;
   measuring an input volume of the received voice input;
   adjusting an output volume of a sound to be output in response to the received voice input based on the measured input volume; and
   determining if an output accuracy for the sound is greater than or equal to an accuracy threshold.

2. The user command processing method of claim 1, wherein the adjusting comprises adjusting the output volume of the sound to be proportional to the measured input volume.

3. The user command processing method of claim 1, further comprising:
   generating control information for outputting visual information corresponding to the sound through a display of another device linked to an electronic device that adjusts the output volume, if the measured input volume is less than or equal to a preset first threshold or if the measured input volume is less than or equal to the preset first threshold and the output accuracy for the sound is greater than or equal to the accuracy threshold; and
   transmitting the generated control information.

4. The user command processing method of claim 1, further comprising:
   adjusting the output volume of the sound based on an utterance duration of a keyword when the voice input comprises the keyword for adjusting the output volume of the sound.

5. The user command processing method of claim 4, wherein the adjusting the output volume comprises increasing or decreasing the output volume of the sound to be proportional to the utterance duration.

6. The user command processing method of claim 1, wherein the sound to be output comprises at least one of an answer and an audio content in response to the voice input.

7. The user command processing method of claim 1, wherein the measuring of the input volume of the received voice input comprises measuring an input volume for a keyword that is preset to wake up an electronic device.

8. The user command processing method of claim 1, further comprising:
   measuring a noise volume for ambient noise; and
   adjusting the output volume of the sound further using the measured noise volume for the ambient noise.

9. The user command processing method of claim 1, further comprising:
   adjusting the output volume of the sound further using set time information for a current time, the set time information having preset volume control parameters when the current time corresponds to a preset time of the set time information.

10. A non-transitory computer-readable storage medium storing a program to implement the method according to claim 1 on a computer.

11. A user command processing system comprising:
    at least one processor configured to execute computer-readable instructions,
    wherein the at least one processor is configured to
    receive a voice input from a user,
    measure an input volume of the received voice input,
    adjust an output volume of a sound to be output in response to the received voice input from the user based on the measured input volume, and
    determining if an output accuracy for the sound is greater than or equal to an accuracy threshold.

12. The user command processing system of claim 11, wherein the at least one processor is configured to
    generate visual information corresponding to the sound, and
    output the visual information through a display linked to an electronic device that adjusts the output volume, if the measured input volume is less than or equal to a first threshold or if the measured input volume is less than or equal to the first threshold and the output accuracy for the sound is greater than or equal to the accuracy threshold.

13. The user command processing system of claim 11, wherein the at least one processor is configured to adjust the output volume of the sound based on an utterance duration of a keyword for adjusting the output volume of the sound when the voice input comprises the keyword for adjusting the output volume of the sound.

14. The user command processing system of claim 11, wherein, to measure the input volume of the received voice input, the at least one processor is configured to measure an input volume for at least one keyword preset to wake up an electronic device in the received voice input and adjust the output volume based on the input volume of the at least one keyword preset to wake up the electronic device.

15. The user command processing system of claim 11, wherein the at least one processor is configured to
    measure a noise volume for ambient noise; and
    adjust the output volume of the sound by further factoring the measured noise volume for the ambient noise.

16. The user command processing system of claim 11, wherein the at least one processor is configured to
    adjust the output volume of the sound further using set time information for a current time,
    the set time information having preset volume control parameters when the current time corresponds to a preset time of the set time information.

* * * * *